United States Patent [19]

Ootsuka

[11] Patent Number: 4,636,971
[45] Date of Patent: Jan. 13, 1987

[54] DATA PROCESSING DEVICE WITH SPECIFIABLE PROGRAM ORDER

[75] Inventor: Tetsuo Ootsuka, Tokyo, Japan
[73] Assignee: Casio Computer Co., Ltd., Tokyo, Japan
[21] Appl. No.: 757,771
[22] Filed: Jul. 23, 1985

Related U.S. Application Data

[63] Continuation of Ser. No. 432,999, Oct. 6, 1982, abandoned.

[30] Foreign Application Priority Data

Oct. 14, 1981 [JP] Japan ................. 56-164506

[51] Int. Cl.⁴ .............................................. G06F 3/00
[52] U.S. Cl. .................................................. 364/709
[58] Field of Search ... 364/200 MS File, 900 MS File, 364/709, 405

[56] References Cited

U.S. PATENT DOCUMENTS

| | | | |
|---|---|---|---|
| 4,153,937 | 5/1979 | Poland | 364/200 |
| 4,317,722 | 2/1982 | Nakano | 364/405 |
| 4,360,872 | 11/1982 | Suzuki et al. | 364/405 |
| 4,389,707 | 6/1983 | Tsuzuki | 364/405 |
| 4,399,508 | 8/1983 | Nakatani et al. | 364/405 |

FOREIGN PATENT DOCUMENTS

| | | |
|---|---|---|
| 1441141 | 7/1976 | United Kingdom . |
| 1465997 | 3/1977 | United Kingdom . |
| 1470180 | 4/1977 | United Kingdom . |

*Primary Examiner*—Gareth D. Shaw
*Assistant Examiner*—John G. Mills
*Attorney, Agent, or Firm*—Frishauf, Holtz, Goodman & Woodward

[57] ABSTRACT

A data processing device such as an electronic cash register includes a keyboard having keys adapted to generate corresponding key codes, and at least one arrangement key for performing a series of operations corresponding to operations which may be performed by operating a plurality of the other keys. Key codes corresponding to the various keys are stored in a memory. A CPU performs arithmetic operations according to the key codes stored in the memory. When a key code corresponding to the arrangement key is entered, the CPU sequentially reads out a plurality of corresponding key codes from the memory and performs a series of operations corresponding to these key codes.

4 Claims, 12 Drawing Figures

F I G. 1
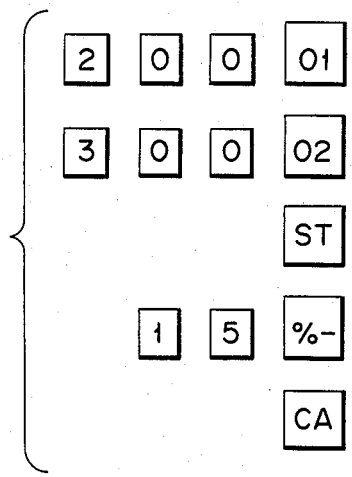
F I G. 2
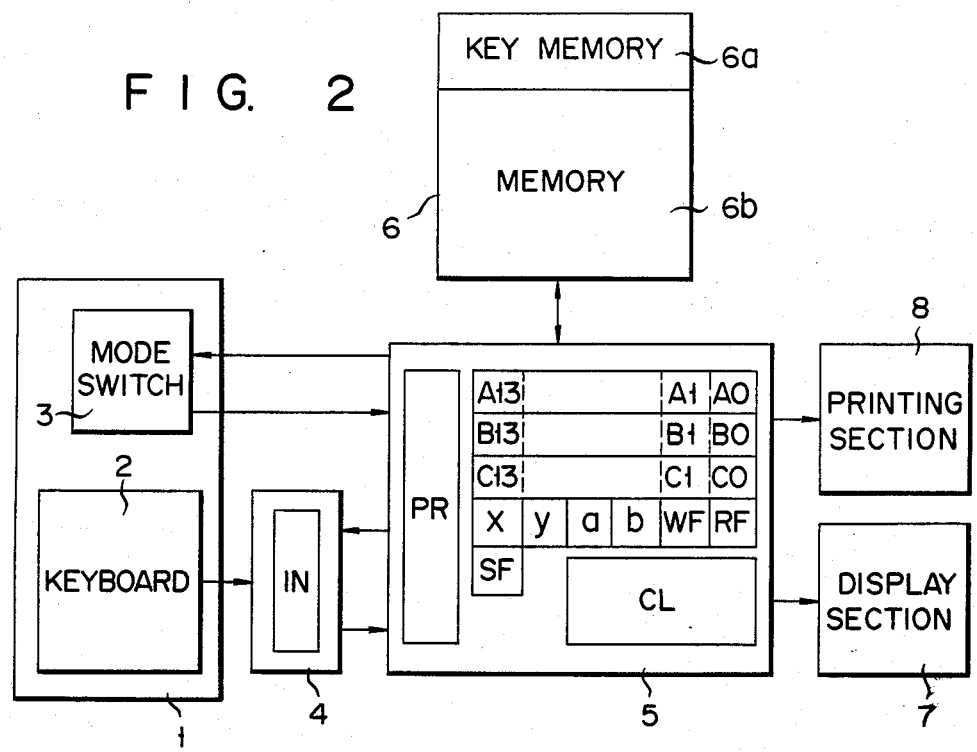

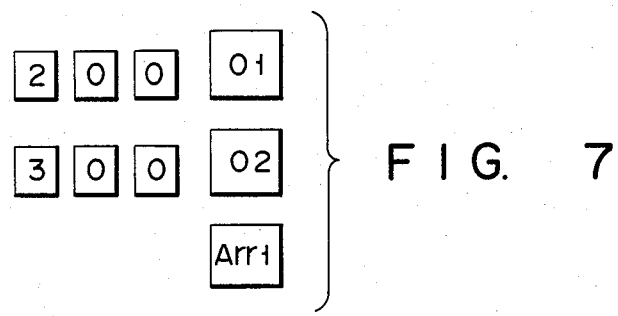
FIG. 7
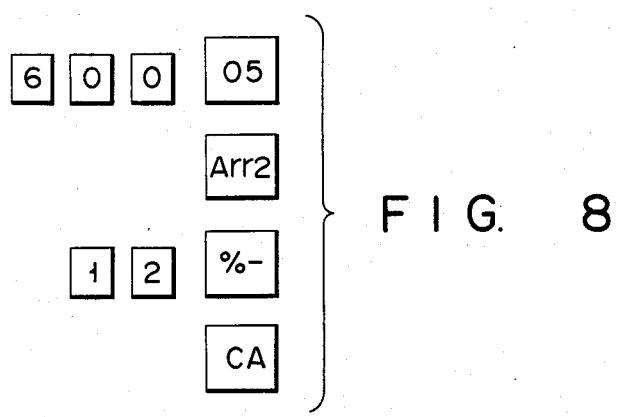
FIG. 8
FIG. 9
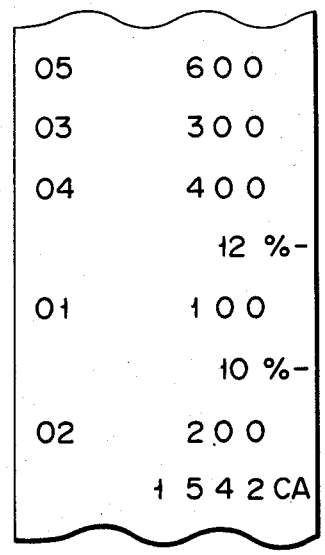

DATA PROCESSING DEVICE WITH SPECIFIABLE PROGRAM ORDER

This application is a continuation of application Ser. No. 432,999 filed Oct. 6, 1982, now abandoned.

BACKGROUND OF THE INVENTION

The present invention relates to a data processing apparatus which allows a specific key to automatically perform a series of arithmetic operations for key codes respectively corresponding to a plurality of keys.

In a data processing apparatus applied to an electronic cash register, the following operation is required in a store which offers a 15% discount, as shown in FIG. 1. After pieces of sales data, "200" and "300" are sequentially entered by the numerical keys and the department keys respectively, the operator must sequentially press a subtotal key ST, numerical keys for a value 15, a discount key %-, and a cash key CA. However, in a case where the operator repeats the same operation for different customers, the key operation becomes inconvenient. Furthermore, if the operator forgets to press the subtotal key ST, a discount is not performed on the subtotal amount data, but on the department data amount (e.g., "300") which is entered immediately before the discount key CA is pressed. If the operator erroneously presses different numerical keys for a discount, a discount value may be mistakenly changed, resulting in great inconvenience.

SUMMARY OF THE INVENTION

The present invention has been made in consideration of the above situation and has for its object to provide a data processing apparatus in which a specific key is operated to automatically perform a series of arithmetic operations which may be performed by operating a plurality of keys.

In order to achieve the above object of the present invention, there is provided a data processing apparatus comprising: keyboard means having numerical keys, function keys and at least one arrangement key which performs arithmetic operations corresponding to the operations performed by operating a plurality of keys, said keyboard means producing a key code for each of said keys; memory means for storing a predetermined key code corresponding to each of said plurality of keys; and a central processing unit, connected to said keyboard means and said memory means, for reading out the key codes from said memory means which have been entered by said keys to execute the arithmetic operations in accordance with the key codes, and for sequentially reading out the plurality of predetermined key codes from said memory means to perform a series of arithmetic operations in accordance with the plurality of predetermined key codes when the key code of said arrangement key is input.

According to the data processing apparatus of the above configuration, the key codes which are sequentially entered in the memory means by the plurality of keys are sequentially read out by pressing a specific key, to perform the arithmetic operations in accordance with the readout key codes.

The series of arithmetic operations usually performed by the plurality of keys can, therefore, be executed by pressing the specific key. Thus, the operator need not repeat the same sequence of key-in operations using the plurality of keys, and mistakes accompanying the performance of the series of arithmetic operations by the plurality of keys can be substantially decreased.

BRIEF DESCRIPTION OF THE DRAWINGS

FIG. 1 is a schematic view showing the order of key-in operation at the keyboard of a conventional cash register;

FIG. 2 is a block diagram of a data processing apparatus according to an embodiment of the present invention;

FIG. 7 is a view showing an example of the order of key-in operation at the keyboard of the data processing apparatus of the present invention;

FIG. 8 is a view showing another example of the order of key-in operation at the keyboard of the data processing apparatus of the present invention;

FIG. 9 is a view showing the printed state on a journal after the key-in operation shown in FIG. 8 is completed;

DETAILED DESCRIPTION OF THE PREFERRED EMBODIMENT

Figure 3:
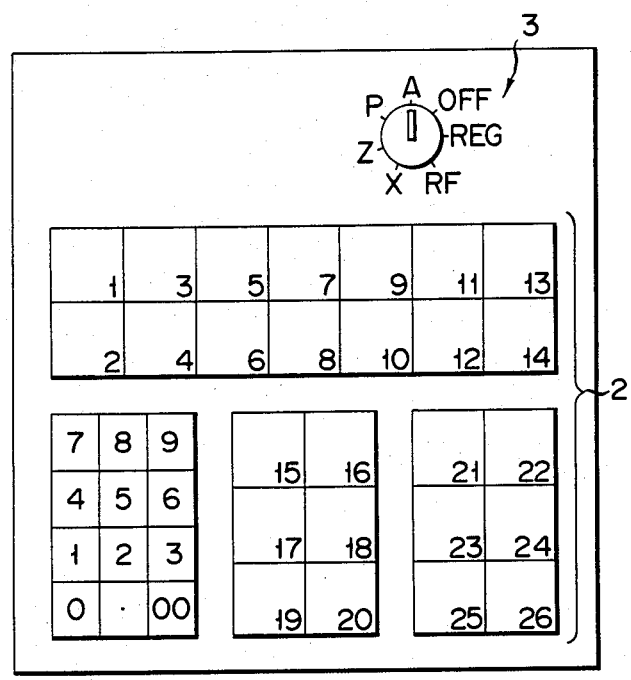
FIG. 3 is a detailed view showing an arrangement of an input section 1 shown in FIG. 1.

FIG. 2 is a block diagram of the data processing apparatus which is used for an electronic cash register according to an embodiment of the present invention. An input section 1 has a keyboard 2 and a mode switch 3. A key signal from the keyboard 2 is supplied to an input buffer IN of an input control circuit 4. A CPU 5 has a program memory PR which stores various microinstructions, a calculation circuit CL which performs various arithmetic calculations, an A register which has digit positions A0 to A13, a B register which has digit positions B0 to B13, a C register which has digit positions C0 to C13, and various registers such as x, y, a, b, WF, RF and SF registers. The CPU 5 produces a read signal to the input control circuit 4, thereby supplying the storage content of the input buffer IN to the input control circuit 4. Furthermore, the CPU 5 supplies a mode detection signal to the mode switch 3, thereby supplying mode designation data from the mode switch 3 to the input control circuit 4. The CPU 5 exchanges data with a memory 6, and the memory 6 reads out and supplies display data to a display section 7 and print data to a printing section 8. The display section 7 displays the display data, and the printing section 8 prints the print data on a journal. The memory 6 has a memory area 6b for storing total sales data for each department and has a memory area 6a for key data.

FIG. 3 shows the detailed configuration of the keyboard 2 and the mode switch 3 in the input control section 1. The keyboard 2 has numerical keys and free function keys indicated by small numerals 1 to 26. The mode switch 3 can be set to the OFF, REG (register), RF (refund), X (read key which is used to read out data without erasing stored data), Z (reset key which is used to read out data and clear the readout data), P (set), or A (arrangement) position (later described in detail).

Figure 5:
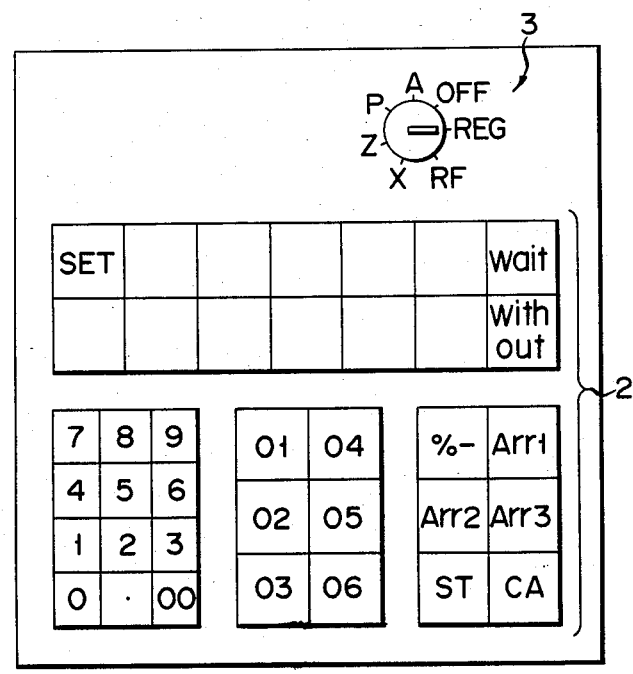
FIG. 5 is a detailed view showing the arrangement of keys after a special function is set in correspondence with the keys shown in FIG. 3.
Figure 4:
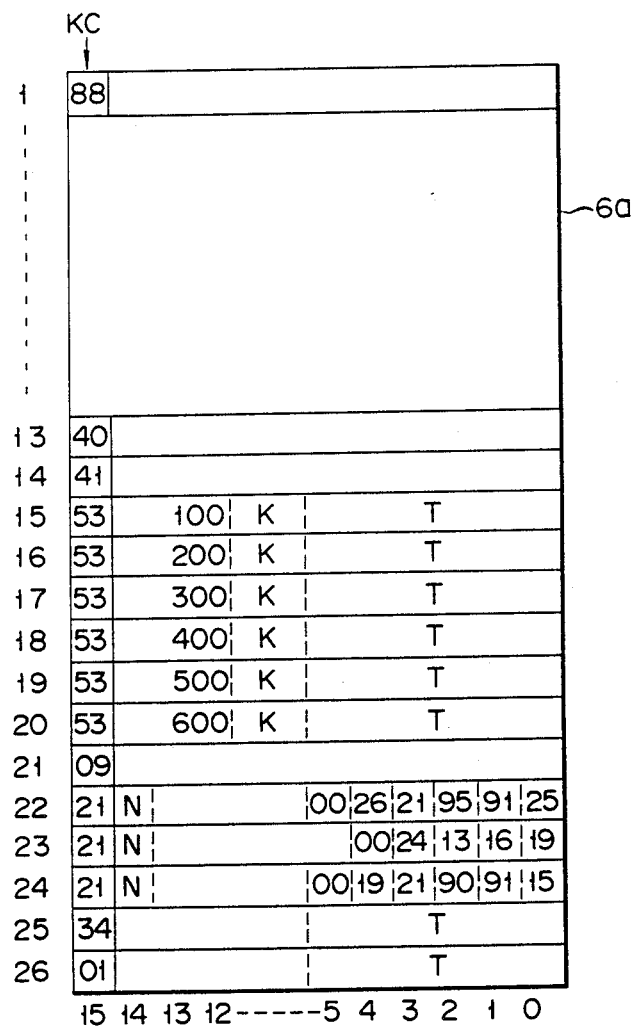
FIG. 4 is a view showing the memory map of the codes respectively corresponding to different keys in a memory area 6a shown in FIG. 2.

The mode of operation of the microcomputer according to an embodiment of the present invention will be described. Assume that the operator sets the mode switch 3 to the P position, and that he presses desired numerical keys and free function keys to enter function codes respectively corresponding to the free function keys. For example, the operator enters a function code "53" in accordance with the operation of the free function keys 15 to 20. A %- (discount) code "09" is entered by the free function key 21. An A (arrangement) code "21" is entered by the free function keys 22 to 24. An ST (subtotal) code "34" is entered by the free function key 25. A CA (cash) code "01" is entered by the free function key 26. A set code "88" is entered by the free function key 1. A "wait" code "40" is entered by the free function key 14. Finally, a "without" code "41" is entered by the free function key 14. The function codes described above are stored in a memory area portion KC of the memory area 6a and are accessed by row addresses which respectively correspond to the free function keys, as shown in FIG. 5. After specific functions are assigned to the free function keys, they are, as a result, operated as specific function keys, as shown in FIG. 5. In the P mode, when the free function keys 15 to 20 are respectively assigned as department keys 01 to 06, pieces of unit price data which are 100 to 600 respectively corresponding to the department keys 01 to 06 are stored in the memory area accessed by row addresses 15 to 20 of the memory area 6a.

Figure 6A:
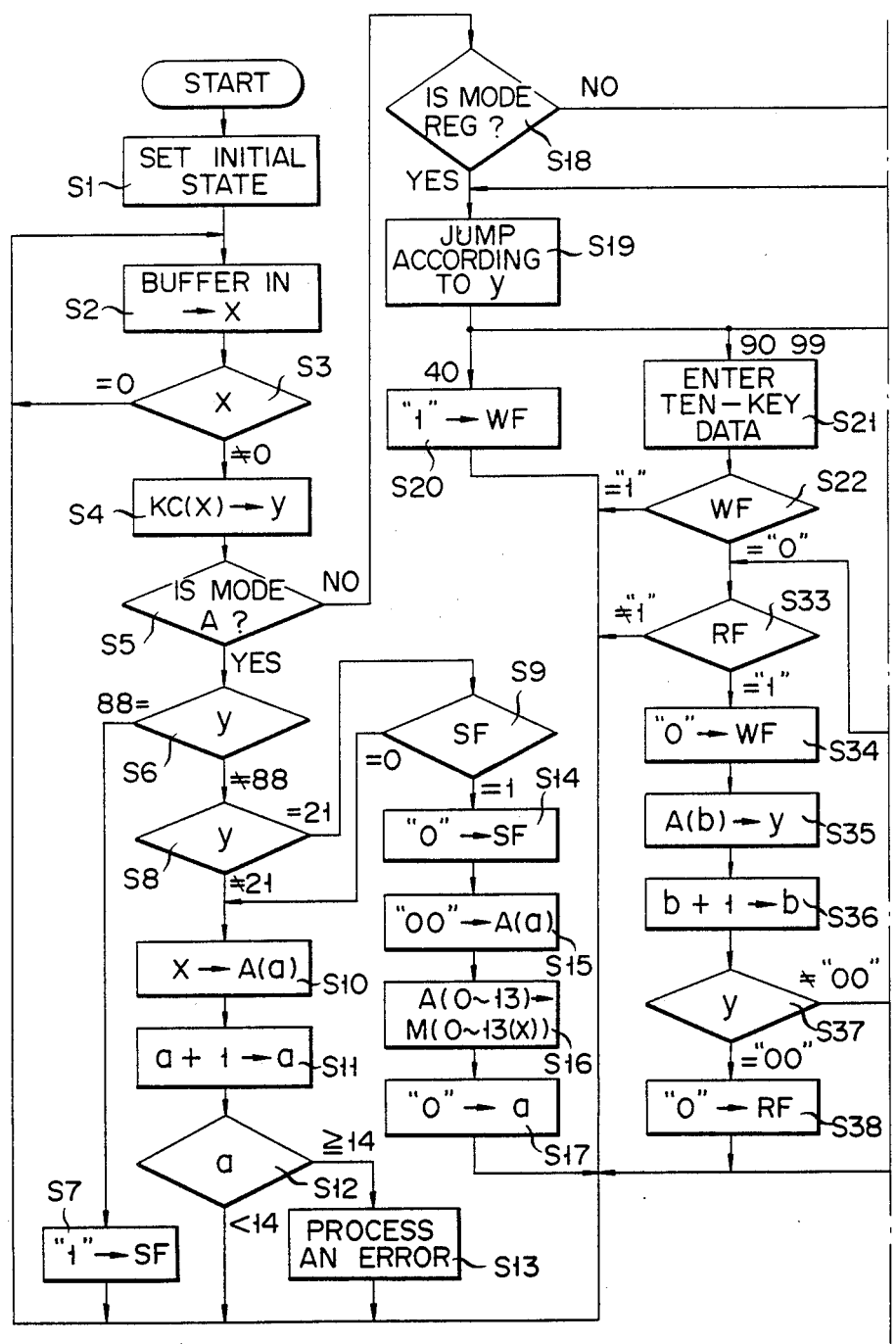
FIGS. 6A and 6B are flow charts for explaining the mode of operation of the data processing apparatus of the present invention.
Figure 6B:
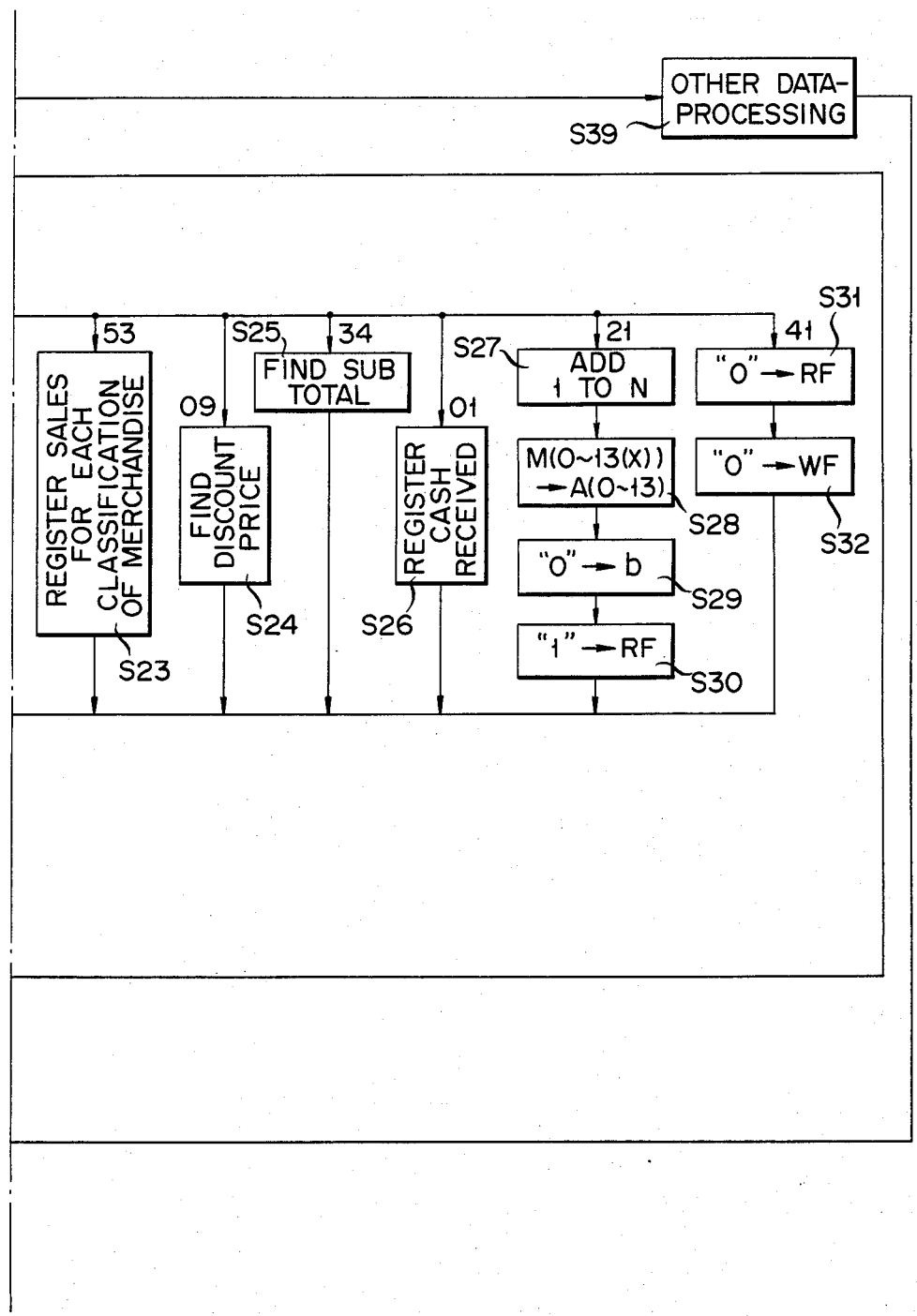

When the electronic cash register is powered, the operations in accordance with the flows shown in FIGS. 6A and 6B are performed. In step S1, initial setting of the memory 6 and the registers of the CPU 5 are performed. In step S2, the storage contents of the input buffer IN are read out by a readout instruction and are retrieved in the x register in the CPU 5. In step S3, the contents of the x register are checked. If it is determined to be zero, the flow does not advance until data is entered. However, when it is determined not to be zero, step S4 is executed. In step S4, from the memory area portion of the memory area 6a which is accessed by the contents of the x register a function code is transferred to the y register of the CPU 5. In step 5, the CPU 5 produces a mode detection signal, and checks whether or not the mode switch 3 is set in the A position. If YES in step 5, the flow advances to step S6. In step S6, it is checked whether or not the y register stores the set code "88". If YES, it is regarded that the set key is operated, and step S7 is executed. In step S7, flag data of logic level "1" which indicates the operation of the set key is written in the SF register in the CPU 5. The flow returns to step S2. However, if in step S6 it is determined that the set code "88" is not stored in the y register, the flow returns to step S8. In step S8, it is checked whether or not the function code stored in the y register is the arrangement code "21". If YES, it is determined that one of an Arr 1 key to an Arr 3 key (FIG. 5) is pressed. The flow advances to step S9. In step S9, it is checked whether or not the flag data of logic level "1" which indicates the operation of the set key is stored in the SF register. If NO, the flow advances to step S10. In step S10, the key code in the x register is transferred to digit position A(a) of the A register which is accessed by the storage contents of the a register. In step S11, data of "1" is added to the storage content of the a register. In step S12, it is checked whether or not the storage content of the a register is greater than "14". If NO, it is determined that the A register has a further capacity to store key codes, and the flow returns to step S2. If YES in step S12, the flow advances to step S13. The key code input overflow operation is performed in step S13. Thereafter, the flow returns to step S2. The loop of steps S2 to S13 is repeated, and key codes are sequentially written in digit positions A(0) to A(13) of the A register. The storage capacity for one digit position in the A register constitutes 8 bits.

However, when in step S9 it is determined that the flag data of logic level "1" is stored in the SF register, the flow advances to step S14. The flag data of logic level "0" is written in the SF register, and the flow advances to step S15. In step S15, an end code "00" which indicates an end of key code writing in the A mode is written in digit position A(a) of the A register. In step S16, the storage contents of digit positions A(0) to A(13) of the A register are transferred to the memory area portions M0 to M13 of the memory area 6a which are accessed by the storage contents of the x register. In step S17, data of logic level "0" is written in the a register in the CPU 5, and then the flow returns to step S2. In this manner, in the A mode, the key codes from the beginning to the key code immediately before the set key is pressed are sequentially stored in the 0th to 13th digit positions of the memory area portion of the memory area 6a in correspondence with the Arr key operation immediately after the set key is pressed.

However, when in step S5 it is determined that the mode switch 3 is not set to the A mode, the flow advances to step S18. In step S18, it is checked whether or not the mode switch 3 is set to the REG mode. If YES, the flow advances to step S19. In step S19, a jump is performed to access an address of the program memory PR in accordance with a content stored in the y register. When the "wait" code "40" is stored in the y register, the flow advances to step S20. In step S20, wait key operation flag data of logic level "1" is written in the WF register in the CPU 5, and the flow returns to step S2. When the numerical codes "90" to "99" are stored in the y register, a jump is performed to execute step S21 where the numerical data operation is performed. In step S22, it is checked whether or not the wait key operation flag data of logic level "1" is stored in the WF register. If YES, the flow returns to step S2. When the department code "53" is stored in the y register, a jump is performed to execute step S23 wherein data of the number of sold items which is stored in the memory area portion K of the memory area 6a is increased by one. The memory area portion K corresponds to the department keys. The operation for registering sales for each department, or "register sales for each classification of merchandise" operation is performed to add price data to the total sales data stored in the memory area portion T. When the %- key code "09" is stored in the y register, jump is performed to execute step S24 where a predetermined discount operation is performed in the calculation circuit CL. When the ST code "34" is stored in the y register, a jump is performed to execute step S25 where "find subtotal" operation is performed to store corresponding data in the corresponding memory area portion T of the memory area 6a and the like.

When the CA code "01" is stored in the y register, a jump is performed to execute step S26 where subtotal data is stored in the corresponding memory area portion T of the memory area 6a and the "register cash received" operation is performed to print the total amount for each customer on the journal. When the Arr code "21" is stored in the y register, a jump is performed to execute step S27 where the "add 1 to N" operation is performed such that one is added to the memory area portion N of the memory area 6a which corresponds to the pressed Arr key. In step S28, the contents stored in the memory area portions M0(x) to M13(x) as the 0 to 13th digit positions of the memory area 6A accessed by the contents of the x register are transferred to 0 to 13th digit positions A(0) to A(13) of the A register. In step S29, data of logic level "0" is stored in the b register for accessing the digit positions of the A registers. In step S30, the Arr key operation flag data of logic level "1" is written in the RF register in the CPU 5. When the "without" code "41" is stored in the y register, a jump is performed to execute step S31. In step S31, data of logic level "0" is stored in the RF register. Thereafter, the Arr key operation is cancelled. In step S32, data of logic level "0" is written in the WF register.

In step S22, when the flag data of logic level "0" is stored in the WF register, or after steps S23, S24, S25, S26, S30 and S32 are executed, the flow advances to step S33. In step S33, it is checked whether or not Arr key operation flag data of logic level "1" is stored in the RF register. If NO, the flow returns to step S2. If YES in step S33, the flow returns to step S34. In step S34, data of logic level "0" is written in the WF flag to clear the "wait" key operation flag data. In step S35, the contents stored in digit position A(b) of the A register which is accessed by the contents of the b register are transferred to the y register. In step S36, one is added to the contents of the b register. In step S37, it is checked whether or not the end code "00" is stored in the y register. If NO, the flow returns to step S19. However, if YES, the flow advances to step S38. In step S38, data of logic level "0" which indicates the end of a series of operations by Arr key is written in the RF register. Thereafter, the flow returns to step S2.

When it is determined in step S18 that the mode switch 3 is not set to the REG mode, however, the flow advances to step S39. Other data processes are performed in accordance with a specified mode, and the flow returns to step S2.

Consider the example wherein the operator sets the mode switch 3 in the A position and sequentially presses the ST key, the numerical keys for a value 15, the %-key, and the CA key to substitute for key operations of a plurality of keys a single key operation of the Arr 1 key. Every time the Arr1 key is pressed, steps S2 to S6 and S8 to S12 are repeatedly performed in which five key codes are sequentially written in the digit positions A(0) to A(4) of the A register. When the operator presses the set key, steps S2 to S7 are sequentially performed. Subsequently, when the operator presses the Arr1 key, steps S9 and S14 to S17 are executed to transfer the storage contents in the digit positions M0 to M4 of the memory area portion M to digit positions A(0) to A(4) of the A register. Furthermore, the end key code "00" is stored in the digit position M5. In the same manner as described above, assume that the operator sequentially presses the department keys 03 and 04, the "wait" key, and the Arr 3 key, and then presses the set key and the Arr 2 key. The key codes and the end code are sequentially stored in the digit positions M0 to M4 of the memory area portion M which are accessed by the row address 23 (of the memory area 6a) corresponding to the Arr 2 key. Similarly, assume that the operator subsequently presses the department key 01, the numerical keys ("1" key and "0" key), the %- key, the department key 02. When the operator subsequently presses the set key and the Arr 2 key, codes "15" to "00" are sequentially stored in the digit positions M0 to M5 of the memory area portion M (memory area 6a) corresponding to the Arr 3 key.

It is assumed as described above that the operator performs setting of the arrangement key and sets the mode switch 3 to the REG mode to register the customer sales. For example, as shown in FIG. 7, when the operator registers data of "200" and "300" respectively for departments 01 and 02, the processing in step S23 is executed. Pieces of sales data are stored in the memory area portion T which is accessed by row addresses 15 and 16 of the memory area 6a. When the operator then presses the Arr 1 key, the processings in steps S27 to S30 and S33 to S37 are performed to transfer, to the A register, the key codes "25" to "00" stored in the digit positions M0 to M5 of the memory area portion M corresponding to the Arr 1 key. Furthermore, data from each digit position of the A register is read out to execute processings according to steps S25, S21, S21, S24, and S26. Finally, the end code "00" is read out to finish a series of arrangement operations. As a result, even if the operator presses only the Arr 1 key, a series of operations by the ST key to the CA key are performed.

As shown in FIG. 8, when the operator registers sales data of "600" for the department 05 and presses the Arr 2 key the key codes "19" to "00" at the digit positions M0 to M4 corresponding to the Arr2 key are transferred to the A register. The storage contents of the A register are read out in units of digit positions. Processings for the department keys 03 and 04 are then performed to store amount data in the memory area portion T which is accessed by the row addresses 17 and 18 of the memory area 6a. At the same time, the data of the number of sold items is increased by one in the memory area portion K. As shown in FIG. 9, data corresponding to the departments 03 and 04 is printed out. Subsequently, when the key code "13" which is entered by the "wait" key and which is stored in the 3rd digit position of the A register is read out, the processing in step S20 is executed. The key code "13" designates a program which causes the CPU to wait. The waiting status is maintained until a new key input is entered. When the operator presses the numerical keys ("1" and "2" keys) after the Arr 2 key is pressed, and he then presses the %- key, processing according to steps S24, S33 to S37 is performed, so that the sales amount "400" for the department 04 is discounted 12%, and the "wait" status which interrupts the subsequent operations of the key codes stored in the A register is cancelled. The next key code "24" is transferred to the y register. Subsequently, processings in steps S19 and S21 to S30 are sequentially performed. The key codes "15" to "00" in the digit positions M0 to M5 corresponding to the Arr 3 key are transferred to the B register. The storage contents of the B register are read out in the units of digit positions, so that processing in steps S23, S21, S21, S24, and S23 are sequentially performed. As a result, "01" to "200" are printed on the journal. When the end code "00" is read out from the A register, the flow returns to step S2. The processing corresponding to the CA key which is pressed after the %-key is pressed is performed, and the total sales amount for the customer is printed on the journal.

Figures 10, 11:
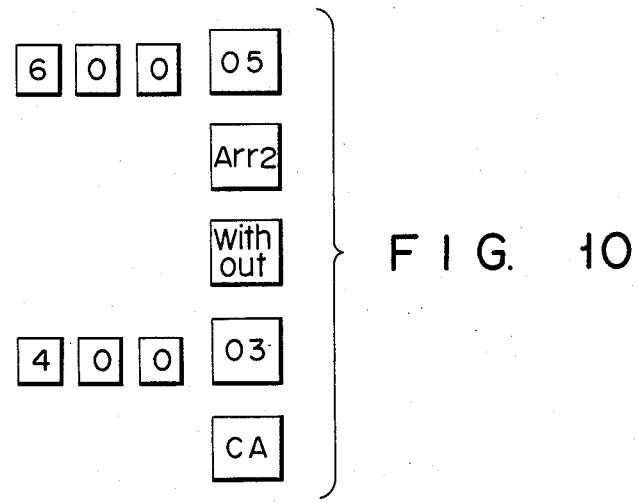
FIG. 10 is a view showing still another example of the order of key-in operation at the keyboard of the data processing apparatus of the present invention.
FIG. 11 is a view showing the printed state on the journal after the key-in operation shown in FIG. 10 is completed.

As shown in FIG. 10, assume that after the operator registers the sales amount for the department 05, he presses the Arr 2 key. Processing in steps S27 to S30 and S33 to S37 is then sequentially performed. The "register sales for each classification of merchandise" operation in step S23 is performed by the key codes "19" and "16" transferred to the A register. As shown in FIG. 11, pieces of data are respectively printed for the departments 03 and 04 on the journal. The key code 13 corresponding to the "wait" key is read out to perform the processings in steps S20 and S2, and the "wait" mode is initiated. When the operator presses the "without" key after pressing the Arr 2 key, the processings in steps S31 to S33 and S2 are performed in accordance with the "without" key code. In other words, the "without" key is a skip key for skipping the program corresponding to any key code stored in the key code memory 6. As a result, the Arr key operation flag data is cleared from the RF register, and the key code "24" which is stored in the A register and which is not used is cancelled. When the operator registers the sales amount for the department 03 after pressing the "without" key, the registration in step S23 is performed and corresponding data is printed on the journal.

As described above, according to this embodiment, key codes are sequentially stored in a memory area corresponding to the Arr 1 key by the arrangement operation. Furthermore, the key codes corresponding to the Arr 1 key can also be stored in the memory area corresponding to the Arr 2 key. Therefore, a multiple of key codes which are accessed by the Arr 2 key can be stored. When the key code corresponding to the "wait" key is stored by the arrangement operation, the operator may press a new key to enter a key code during the key code processings which are sequentially performed by the Arr key at the time of registration, and he can interrupt the previous key code processing. After the newly entered data processing is completed, interrupted and unoperated key code processing can then be performed. It is very convenient for the operator to interrupt the key code processing with the Arr key so as to enter data by other keys. Furthermore, when the operator sets the key code corresponding to the "wait" key by the Arr key operation, and when the operator presses the "without" key after pressing the above Arr key at the time of registration, the processing of the key codes set after the key code corresponding to the "wait" key can be cancelled, which is particularly convenient.

When the key code of the Arr key which is set during the key code processing by the Arr key is read out, the contents in the memory area M0 to M13 (of the memory area 6a) which correspond to the Arr key and which are read out are transferred to the A register. However, when the key code corresponding to the first Arr key operation is already stored in the A register, the storage contents at the digit positions M0(x) to M13(x) are transferred to the B register. When the second Arr key code is read out and both the A and B registers are occupied, the storage contents are transferred to the C register. The key codes stored in the A, B and C registers are sequentially processed in the setting order.

What is claimed is:

1. A non-programmable type data processing calculator apparatus, comprising:
   a keyboard including an arrangement key and and keys adapted to generate key codes;
   program memory means including a ROM for storing programs each of which corresponds to a different one of the key codes generated by said keys;
   key code memory means for storing a plurality of sequences of key codes, and for generating in response to operation of said arrangement key the stored key codes in the order in which they have been entered in said key code memory means after operation of the keys in a desired sequence;
   said keyboard further including means for selecting an operation mode for writing key codes in said key code memory means, one after another, as the corresponding keys of said keyboard are operated; and
   a central processing unit coupled to said keyboard, said program memory means and said key code memory means for executing the program corresponding to a generated one of said key codes and read from said program memory means when the corresponding one of the keys is operated, and, responsive to operation of said arrangement key for causing said key code memory means to generate the plurality of key codes stored in said key code memory means wherein said program memory means reads out each of the programs corresponding to the key codes, and said central processing unit executes the corresponding programs in the desired sequence.

2. A data processing apparatus according to claim 1, wherein said keyboard further includes code writing means for writing in said key code memory means, a certain code designating a program for causing said central processing unit to wait for the key codes from said key code memory means, and said central processing unit enters a waiting state when said code writing means writes said certain code, and waits for the key codes from key code memory means.

3. A data processing apparatus according to claim 2, wherein said central processing unit comes out of said waiting state when one key is operated and executes the program corresponding to the key code generated by the operated key, and said central processing unit executes other programs corresponding to key codes stored in said key code memory means after the generated key code.

4. A data processing apparatus according to claim 2, wherein said keyboard further includes a skip key for generating a key code to cause said central processing unit to skip 24 execution of a program corresponding to one key code stored in said key code memory means, and programs corresponding to other key codes stored in said key code memory remain to be executed when said skip key is operated when said central processing unit is in said waiting state.

* * * * *